United States Patent
Wang et al.

(10) Patent No.: US 8,437,371 B2
(45) Date of Patent: May 7, 2013

(54) GATEWAY, BASE STATION, COMMUNICATION NETWORK AND SYNCHRONIZATION METHOD THEREOF

(75) Inventors: He Wang, Shanghai (CN); Zhongji Hu, Shanghai (CN); Yonggang Wang, Shanghai (CN); Hua Chao, Shanghai (CN); Yu Chen, Shanghai (CN); Pingping Xing, Shanghai (CN)

(73) Assignee: Alcatel Lucent, Paris (FR)

( * ) Notice: Subject to any disclaimer, the term of this patent is extended or adjusted under 35 U.S.C. 154(b) by 359 days.

(21) Appl. No.: 12/438,110

(22) PCT Filed: Aug. 22, 2007

(86) PCT No.: PCT/CN2007/002535
§ 371 (c)(1),
(2), (4) Date: Feb. 19, 2009

(87) PCT Pub. No.: WO2008/025245
PCT Pub. Date: Mar. 6, 2008

(65) Prior Publication Data
US 2011/0268018 A1    Nov. 3, 2011

(30) Foreign Application Priority Data
Aug. 22, 2006   (CN) .......................... 2006 1 0109908

(51) Int. Cl.
*H04J 3/06* (2006.01)
(52) U.S. Cl.
USPC ............................ 370/509; 370/401; 370/338
(58) Field of Classification Search .................. None
See application file for complete search history.

(56) References Cited

U.S. PATENT DOCUMENTS

| | | | | |
|---|---|---|---|---|
| 6,647,026 | B1 * | 11/2003 | Tanaka | 370/509 |
| 7,457,973 | B2 * | 11/2008 | Liu | 713/310 |
| 7,738,505 | B2 * | 6/2010 | Chang | 370/507 |
| 2002/0068567 | A1 | 6/2002 | Johansson | |
| 2006/0154679 | A1 | 7/2006 | Chang | |

FOREIGN PATENT DOCUMENTS

| | | |
|---|---|---|
| CN | 1706124 A | 12/2005 |
| WO | 0069102 A1 | 11/2000 |

OTHER PUBLICATIONS

International Search Report.
(Continued)

*Primary Examiner* — Duc C Ho
(74) *Attorney, Agent, or Firm* — Fay Sharpe LLP

(57) ABSTRACT

Discloses is a gateway, base station, communication network and synchronization method thereof. The method comprises: at time T1, sending from the gateway to the base stations a synchronization request signal; at time T2, receiving by the base stations the synchronization request signal; at time T3, sending from the base stations to the gateway the synchronization response comprising the times T2 and T3; at time T4, receiving by the gateway the synchronization response signals; and calculating for the base stations a mapping relationship between the time system of the gateway and the time system of the base station is calculated based on the times T1, T2, T3 and T4. With the configuration and method proposed in present invention, it can be avoided the problem that accurate synchronization between the gateway and the base stations can not be reached for MBMS data packets in LTE because of path delay and jitter error, so that every base station can specify the same transmitting time for MBMS data packets to guarantee that UE could implement correct RF combining.

38 Claims, 8 Drawing Sheets

OTHER PUBLICATIONS

ETSI TS 125 402, Universal Mobile Telecommunications System (UMTS); Syncronization in UTRAN, Stage 2 (3GPP TS 25.402 version 6.3.0. Release 6), Jun. 2005; 50 pages.

PCT Written Opinion of the International Searching Authority, PCT Application No. PCT/CN2007/002535, Nov. 29, 2007, 4 pages.

English Bibliography for Chinese Patent Application Publication No. 1706124, filed Jul. 12, 2004, Printed from Thomson Innovation on Feb. 9, 2012 (3 pages).

PCT International Search Report, PCT Application No. PCT/CN2007/002535; Nov. 29, 2007, 4 pages.

Wang, Sunjie. Research of Synchronization Technology of WCDMA Access Network. University of Electronic Science and Technology of China. Master Dissertation. 2004. p. 3, line 15—p. 5, line 3; p. 30, line 1—p. 35, line 4; figures 2.2, 4.3-4.5.

English translation of Wang, Sunjie. Research of Synchronization Technology of WCDMA Access Network. University of Electronic Science and Technology of China. Master Dissertation. 2004. p. 3, line 15—p. 5, line 3; p. 30, line 1—p. 35, line 4; figures 2.2, 4.3-4.5, Momingside translation completed Aug. 24, 2012 (7 pages).

\* cited by examiner

GATEWAY, BASE STATION, COMMUNICATION NETWORK AND SYNCHRONIZATION METHOD THEREOF

FIELD OF INVENTION

The present invention relates to a synchronization technique in mobile communications, especially to a gateway, a base station and a communication network supporting RF combining and the synchronization method thereof.

BACKGROUND OF INVENTION

In the 3GPP LTE, a two-layer flat network architecture is adopted in the core network, i.e., the four network units of NodeB, RNC, SGSN and GGSN in the WCDMA/HSDPA stage are evolved into such two as the eNodeB, viz., the evolved Node B (eNB) ('Base Station' for short hereinafter), and the access gateway (aGW). And the fully IP distributed structure is adopted in the core network to support IMS, VoIP, SIP and MobileIP, etc.

FIG. 1 illustrates the network structure in an LTE system. The aGW may establish connections to multiple eNBs (e.g., eNB1, eNB2 and eNB3) through interface S1. And the eNBs may establish connections with each other in mesh (the dashed line in FIG. 1) through interface X2. The cells of eNB1~3 have some illustrative user equipments as UE11~E12, UE21~23 and UE31~33 respectively.

In LTE system, OFDM is adopted as the physical layer downlink transmission scheme for radio interface, and SC-FDMA is adopted as the uplink transmission scheme. With the application of OFDM, the same radio signal in different cells can be naturally combined in the air to improve the signal strength without any extra processing overhead, as is called the radio frequency combining (RF combining).

Therefore, the requirement to improve the gains on cell boundaries by supporting in-the-air RF combining under single-frequency network (SFN) multiple-cell transmission mode is defined as a baseline for the EMBMS in LTE, for it is necessary for EMBMS to transmit the same service data to different UEs.

The physical layer frame timing synchronization has been achieved for an eNB in the SFN with the precision satisfying the RF combining requirement for EMBMS. However, to guarantee the effectiveness of RF combining, the radio signals to be combined are required to be MBMS service content synchronous and consistent. That is to say, layer 2 (L2) transmission synchronization should be guaranteed for MBMS service's multi-cell transmission.

In addition, in LTE network architecture design, IP multicast transmission has been extended to eNB level in LTE architecture. The MBMS packet will be sent only once to a group of eNBs using IP multicast transmission. And current IP multicast routing protocol can guarantee that the route between each eNB and aGW mainly depends on network topology deployment and will not change unless the involved routers collapse. This instance will rarely happen. Besides, the router processing capability and transport network loading will be optimized during the network planning. So the only fact of the different transmission time delay is the different transmission route from aGW to eNBs. That is to say in spite of physical layer time synchronization in SFN area, different eNBs may receive the same MBMS packet at different time by different route.

FIG. 2 illustrates the transmission delays that the same data packet is transmitted from the aGW to different eNBs. As shown in FIG. 2(a), the routing through which the data packet is transmitted from aGW to eNB1 is: aGW==>router R1==>eNB1. And the routing through which the data packet is transmitted from aGW to eNB2 is: aGW==>router R2==>router R3==>eNB2. Different delays are resulted from that the same data packet is transmitted through different paths.

As shown in FIG. 2(b), at time $T_0$, the data packet is transmitted from aGW to eNB1 and eNB2 respectively. It reaches eNB1 at time $T_1$, and reaches eNB2 at time $T_2$. Therefore, delay $TD=T_2-T_1$ causes to the transmission of the same data packet to different eNBs.

In this way, if the data packet is transmitted out just after it is received respectively by eNB1 and eNB2 from aGW, clearly it is asynchronously transmitted by different eNBs to UE. This results in that these data packets can not be combined correctly, or even causes extra interference. Moreover, after the same data packet arrives at the eNBs, it is necessary for each eNB to perform such operations as segmentation, coding and modulation and so on for frame construction. Inconsistent framing time will also affect these data packets' RF combining.

SUMMARY OF INVENTION

For the problem mentioned above, this invention is implemented. It is an object of the present invention to propose a gateway, a base station, a communication network and the synchronization method thereof to satisfy the requirement on MBMS packet's RF combining in LTE.

According to one aspect of present invention, it provides a method for implementing synchronization between a gateway and bas stations, comprising the steps of: at time T1, sending from the gateway to the base stations a synchronization request signal; at time T2, receiving by the base stations the synchronization request signal; at time T3, sending from the base stations to the gateway the synchronization response comprising the times T2 and T3; at time T4, receiving by the gateway the synchronization response signals; and calculating for the base stations a mapping relationship between the time system of the gateway and the time system of the base station is calculated based on the times T1, T2, T3 and T4.

According to another aspect of present invention, it provides a method for implementing synchronization between a gateway and base stations, comprising the steps of: at time T1, sending from the gateway to the base stations a synchronization request signal; at time T2, receiving by the base stations the synchronization request signal; at time T3, sending from the base stations to the gateway the synchronization response signals comprising the time T2 and the first offset between the base station's time system and a baseline time; receiving by the gateway the synchronization response signal and calculating the mapping relationship between the gateway's time system and the base station's time system for each base station according to the first offset and the second offset between the gateway's time system and the baseline time.

According to another aspect of present invention, it provides a gateway comprising: communication means adapted to transmit a synchronization request signal to at least one base station at time T1, and to receive from the base station at time T4 synchronization response signals including the time T2 when the base station receive the synchronization request signal and the time T3 when the base station transmit the synchronization response signal; and calculation means adapted to calculating for the base station the mapping relationship between the gateway's time system and the base station's time system according to times T1, T2, T3 and T4.

According to another aspect of present invention, it provides a base station comprising: communication means which is adapted to receive a synchronization request signal, send information including the time moment when receiving the synchronization request signal and the information including the time when sending the synchronization response signal to a gateway, receive the mapping relationship between the base station's time system and the gateway's time system from the gateway and receive from the gateway the data packets including the expected transmitting time; and translating means which is adapted to translate the expected transmitting time into the real transmitting time under the base station's time system.

According to another aspect of present invention, it provides a gateway comprising: communication means which is adapted to transmit a synchronization request signal to at least one base station at time T1, and receive from the base station synchronization response signals including the time T2 when the base station receive the synchronization request signal and the first offset between the base station's time system the baseline time; and calculation means which is adapted to calculating for the base station the mapping relationship between the gateway's time system and the base station's time systems according to the first offset and the second offset between the base station's time system and the baseline time.

According to another aspect of present invention, a base station comprising: communication means which is adapted to receive a synchronization request signal, send information including the time moment when receive the synchronization request signal and information including the time moment when sending the synchronization response signal to a gateway, receive from the gateway the mapping relationship between the base station's time systems and the gateway's time system from the gateway and receive the data packets including the expected transmitting time; and translation means which is adapted to translate the expected transmitting time into the real transmitting time under the base station's time system.

According to another aspect of present invention, a communication network comprising at least one gateway as described above and at least one base station as described above.

With the configuration and method proposed in present invention, it can be avoided the problem that accurate synchronization between the aGW and eNB can not be reached for MBMS data packets in LTE because of path delay and jitter error, so that every eNB can specify the same transmitting time for MBMS data packets to guarantee that UE could implement correct RF combining.

BRIEF DESCRIPTION OF THE DRAWINGS

The characteristics and advantages of present invention can be described to be more obvious and detailed with reference to the drawings in which.

DETAILED DESCRIPTION OF THE PREFERRED EMBODIMENTS

Figure 1:
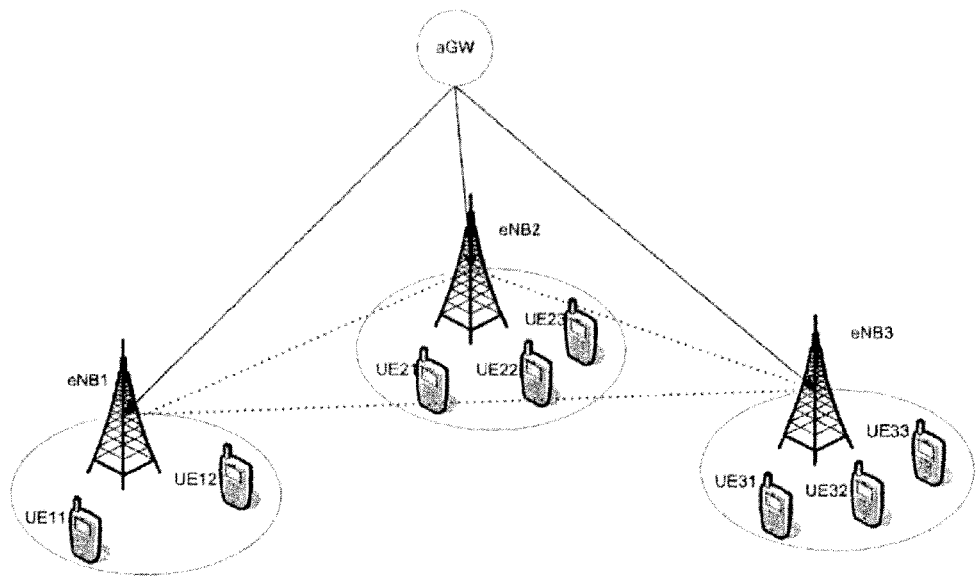
FIG. 1 illustrates a LTE network structure.
Figure 2:
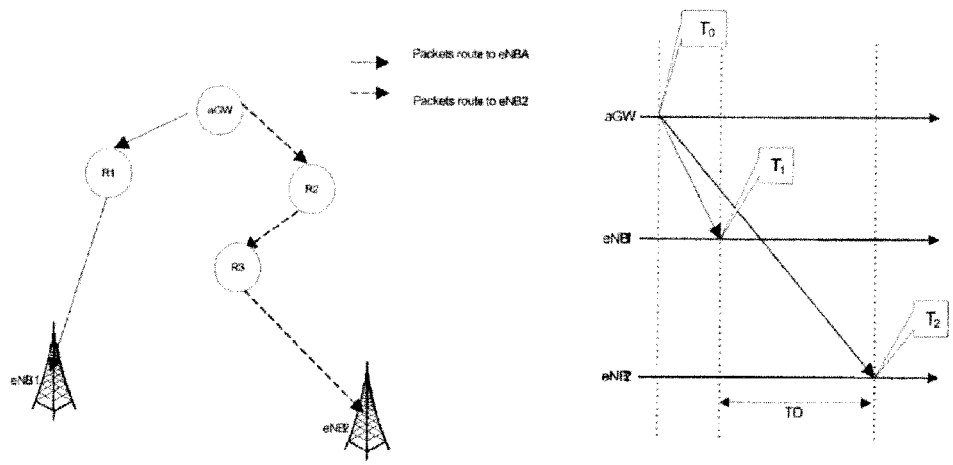
FIG. 2 is a schematic diagram illustrating the delays that the same data packet is transmitted from an aGW to different eNBs.

Now, let's get down to detailed description on the preferred embodiments of the present invention with reference to the drawings. Among the attached figures, the same reference numerals (although in different figures) denote the same or similar components. To be clear and concise, description on well known function and structure will be omitted for not disturbing the presentation on present invention's main idea.

[First Embodiment]

Figure 3:
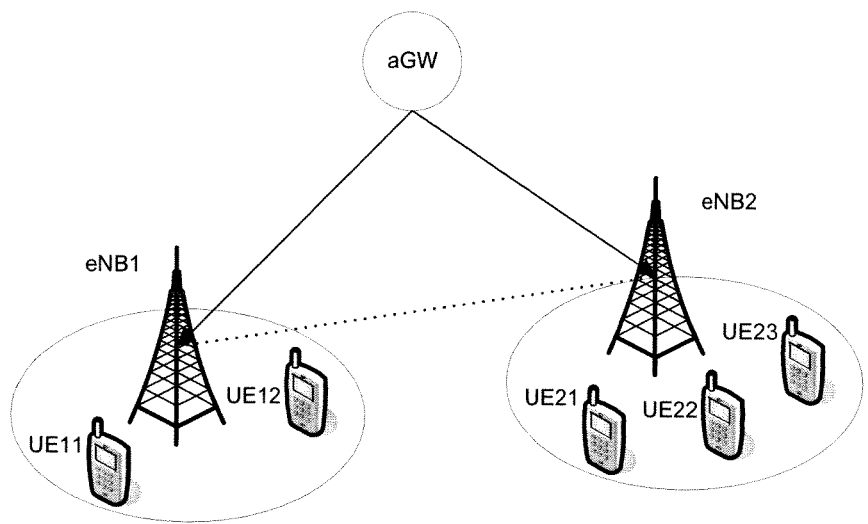
FIG. 3 illustrates a network structure proposed according to an embodiment of the present invention.

FIG. 3 illustrates a network structure proposed according to an embodiment of the present invention. For the convenience of description, only one aGW, two eNBs (eNB1 and eNB2) in an SFN area, and UE11, UE12, UE21, UE22 and UE23 are shown in FIG. 3. Some other devices like routers, etc. are omitted here. Obviously, the adoption of the network structure aims at illustrating the present invention. No network launched in practice bears the exact structure of this one. Ordinary technician in this field can adopt multiple aGWs, more eNBs and other complementary devices in practice.

Figure 4:
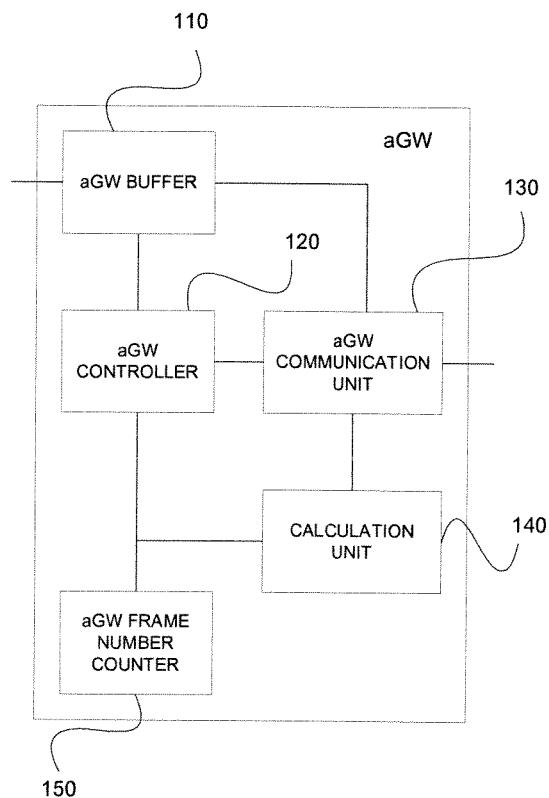
FIG. 4 illustrates a block diagram of an aGW according to the first embodiment of the present invention.
Figure 5:
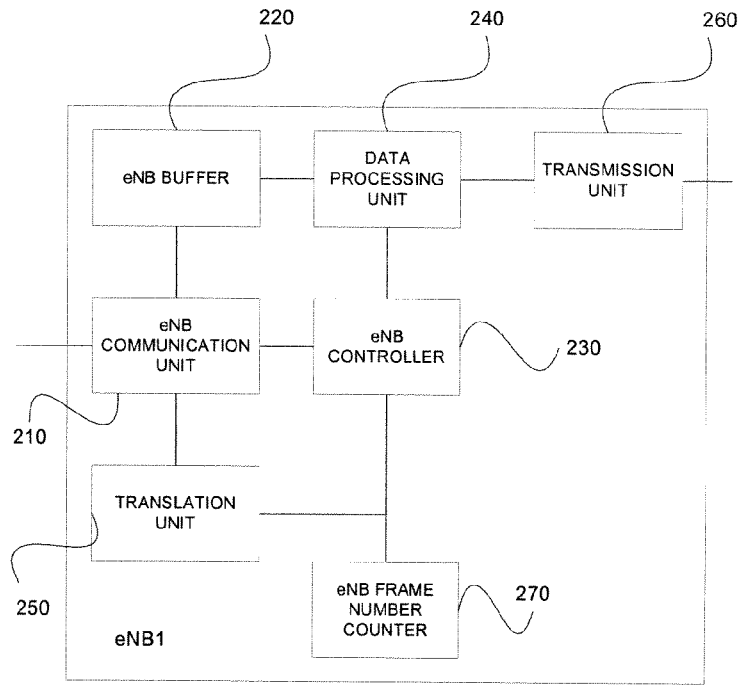
FIG. 5 illustrates a block diagram of an eNB according to the first embodiment of the present invention.

FIG. 4 illustrates a block diagram of an aGW according to the first embodiment of present invention. FIG. 5 illustrates a block diagram of the eNB according to the first embodiment of present invention.

As shown in FIG. 4, the aGW in the first embodiment includes a gateway buffer 110 which buffers the MBMS data packets transmitted from the multimedia broadcast and multicast center, a gateway controller 120 which controls the entire gateway's operations, a gateway communication unit 130 which transmits data packets and signals to UEs and receives signals from UEs, a gateway frame number counter 150 which acts as the system timer of the aGW, and a calculation unit 140 which calculate the transmission delays and transmitting time according to the signals received by communication unit from UEs.

As shown in FIG. 5, the eNB1 in the first embodiment includes a communication unit 210 which is responsible for communicating with aGW, an eNB buffer 220 which buffers MBMS data packets transmitted from the aGW, an eNB controller 230 which controls the entire eNB1, a translation unit 250 which translate the MBMS data packet's transmitting time into the real one in BFN format according to the mapping relationship transmitted from the aGW, an eNB frame number counter 270, a data processing unit 240 which implements such operations as segmentation, frame construction and modulation to the received MBMS data packets, and a transmission unit 260 which transmits the processed data packets in the data processing unit 240 to UEs according to the transmitting time obtained through the translation unit 250. The eNB2 bears the same structure as eNB1. No detailed description will be given here.

The structure of aGW and the structure of eNB have been illustrated above in the mode of individually describing their functional blocks respectively. But it only aims at clearly explaining the functions of the aGW and eNB. Ordinary technician in this field can either integrate the one or more or even all functions into single hardware, or implement some functions in hardware and the others in software, or implement all functions in software absolutely.

Figure 6:
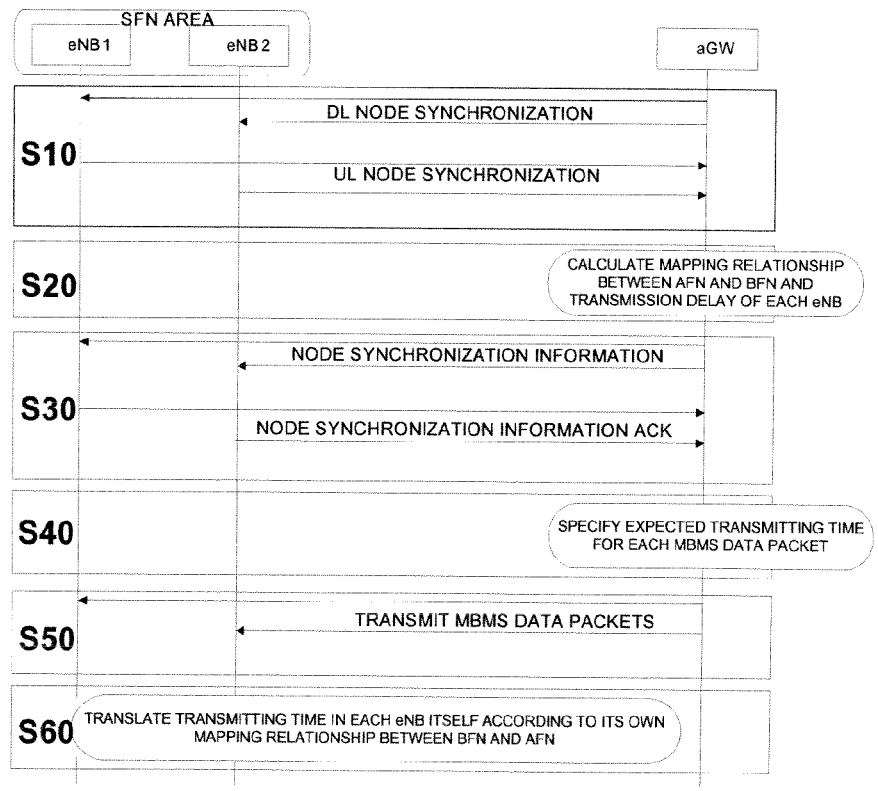
FIG. 6 illustrates the flow of operations implemented between the aGW and the eNB according to the first embodiment.

FIG. 6 illustrates the flow of operations implemented between the aGW and the eNB in the first embodiment.

As shown in FIG. 6, in step S10, the synchronization process is implemented between eNBi (i=1, 2) and the aGW after the aGW is powered on, or in the case that some event (e.g., the preset time everyday) is triggered, so as to obtain the corresponding or mapping relationship ($\Delta_i$) between the aGW's system frame number AFN and eNBi's system frame number BFN-i and the transmission delays $TD_i$ between the aGW and eNBi.

Since no absolute time system (but the respective system frame number) is applied in either the aGW's system timing or eNBi's system timing, it is necessary for us to explain the relationship between the two counters, viz., the gateway frame number counter 150 and the eNB frame number counter 270.

Figure 7:
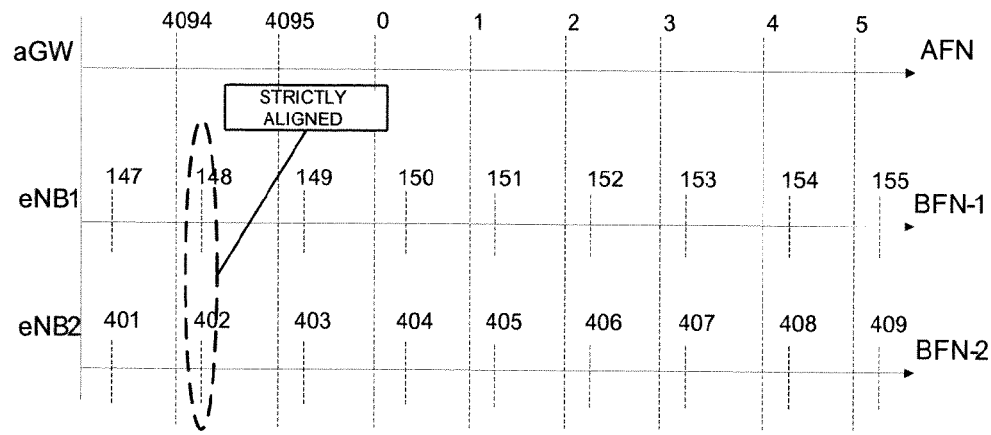
FIG. 7 illustrates the relationship between the frame number counter of the aGW and that of the eNB.

FIG. 7 illustrates the relationship between the respective frame number counters of the aGW and the eNB in SFN area.

In FIG. 7, AFN denotes the time counter of the aGW in its own frame number format, BFN-1 denotes the time counter of the eNB1 in its own frame number format, BFN-2 denotes the time counter of the eNB2 in its own frame number format. And the same precision of ⅛ frame is adopted by AFN and BFN. That is to say, BFN-1 indicates the value of eNB1's frame number counter 270. Similar to the BFN defined in WCDMA R6, it is the time reference adopted by eNB for network synchronization with the value in the range 0~4095. AFN indicates the value of aGW's frame number counter 150. Similar to the RFN defined in WCDMA R6, it is the time reference adopted by aGW for network synchronization with the value also in the range 0~4095. Having been powered on and initialized, both aGW's frame number counter 270 and the eNB's frame number counter 150 implement counting independently. In the SFN area, since synchronization has been guaranteed for physical layer frame timing, the BFN-is of the eNBis in this area are aligned to the same frame on the boundaries. But in the case of no common reference clock, an offset usually exists between the frame number of eNBi and that of the aGW, as shown in FIG. 7.

Although offsets exist between the frame number of the aGW and that of eNBs, no negative affection will be caused to data transmission, for data transmission starts from each frame's boundary and each frame is marked with frame number as its time stamp. Therefore, the transmission layer's synchronization requirement can be satisfied under condition that the same MBMS data frames to be transmitted from eNBi in SFN area are transmitted starting from the aligned BFN frame boundary.

Figure 8:
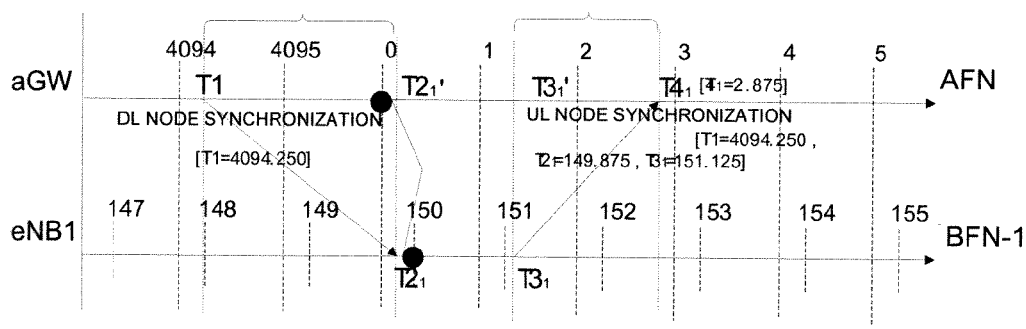
FIG. 8 illustrates the synchronization between the aGW and eNB in the case of no common reference clock.

FIG. 8 illustrates the synchronization between the aGW and the eNB in the case of no common reference clock.

As shown in FIG. 8, in the first place, the gateway controller 120 sends a downlink synchronization signal (e.g., the downlink synchronization control frame) to the eNBs in SFN area through the gateway communication unit 130, requesting to synchronize with the eNBi. It records the current frame number in the aGW's frame number counter 150 as the transmitting time T1 (the first time moment), which is included in the downlink synchronization signal. Obviously, the transmitting time T1 (the first time moment) is just the one under the aGW's time system.

Then, each eNBi receives the downlink synchronization signal in virtue of the eNB's communication unit 210 and records the current frame number in the eNB's frame number counter 270 as the time $T2_i$ (the second time moment) for the receiving of downlink synchronization signal, where i=1, 2, the index of the eNBi. Now, the eNBi responds an uplink node synchronization signal like the uplink node synchronization control frame to the aGW, including at least the time $T2_i$ (which is in the format of eNB's frame number) when corresponding eNBi receives the downlink synchronization signal, and the time $T3_i$ (the 3$^{rd}$ time moment) when corresponding eNBi transmits the uplink node synchronization signal, or including the transmitting time T1, as shown in FIG. 8. Similarly, both $T2_i$ (the 2$^{nd}$ time moment) and $T3_i$ (the 3$^{rd}$ time moment) are the ones under the eNB's time system.

Now, the gateway controller 120 receives the uplink node synchronization signals from the eNBi in virtue of the gateway communication unit 130 and records the current frame number in the gateway counter 150 as the time $T4_i$ (the 4$^{th}$ time moment) for the receiving of the uplink node synchronization signals. Please note that the counting precision on all above frame numbers is ⅛ frames, and $T4_i$ (the 4$^{th}$ time moment) is the one under the aGW's time system.

Here, we suppose that the same delay exists in both the downlink transmission and the uplink transmission. For each eNBi, we have (following descriptions are done to all eNBs, so the subscript i is omitted):

$$(T2_i'-T1) \bmod 4096 = (T4_i-T3_i') \bmod 4096 \quad (1)$$

where $T2_i'$ and $T3_i'$ respectively indicate the frame numbers (time moments) in AFN format corresponding to $T2_i$ and $T3_i$ in BFN format, thus:

$$T2_i=(T2_i'+\Delta_i) \bmod 4096, T3_i=(T3_i'+\Delta_i) \bmod 4096 \quad (2)$$

So:

$$(T2_i-\Delta_i-T1) \bmod 4096 = (T4_i-T3_i+\Delta_i) \bmod 4096 \quad (3)$$

Now, the mapping relationship between BFN and AFN is obtained as:

$$\Delta_i = \text{Round}[((T2_i-T1+T3_i-T4_i) \bmod 4096)/2] \quad (4)$$

and the transmission delay between the aGW and the eNB in this routing is obtained as:

$$TD_i = \text{Ceil}[((T2_i-T1+T4_i-T3_i) \bmod 4096)/2] \quad (5)$$

where Round denotes the rounding function and Ceil denotes the function of upper rounding into integer. And according to the received time moments and formulae (4) and (5), the calculation unit 140 calculates the mapping relationship and the transmission delay.

Now, with the help of concrete data illustrated in FIG. 8, let's take the relationship and transmission delay exist in the aGW and eNB1 as an example to further describe how to obtain the synchronization time information.

As shown in FIG. 8, the aGW's communication unit 130 transmits the downlink node synchronization signal to the eNB at the current frame number in the aGW's frame number counter 150, viz., at the time T1=4094.250, including the transmitting time T1. Then, the eNB1's communication unit 210 receives the downlink node synchronization signal at the current frame number in the eNB's frame number counter 270, viz., at the time $T2_1$=149.875.

The eNB1's communication unit 210 transmits the uplink node synchronization signal at the current frame number in the eNB's frame number counter 270, viz., at the time $T3_1$=151.125, including the aGW's transmitting time T1, the time $T2_1$ when eNB1 receives the downlink node synchronization signal and the time $T3_1$ when eNB1 transmits the uplink node synchronization signal. However, as mentioned above, since the aGW can record the time T1, it is not necessary to include the information on T1 in the uplink node synchronization signal.

The aGW's communication unit 130 receives the uplink node synchronization signal at the current frame number in the aGW's frame number counter 150, viz., at the time $T4_1$=2.875.

Then, in step S20, the calculation unit 140 calculates following information with T1, $T2_1$, $T3_1$ and $T4_1$ and the formulae (4) and (5):

The mapping relationship between the aGW frame number AFN and the eNB frame number BFN-1:

$$\Delta_1 = \text{Round}[((T2_1-T1+T3_1-T4_1) \bmod 4096)/2] = 150$$

then BFN-1=(AFN+150) mod 4096 and the transmission delay in the transmission path from the aGW to the eNB1:

$$TD_1 = \text{Ceil}[((T2_1-T1+T4_1-T3_1) \bmod 4096)/2] = 2.$$

In this way, we obtain the mapping relationship $\Delta_i$ and the transmission delay $TD_i$ between the aGW and the eNBs.

In addition, since clock drifts exist in both the time systems of aGW and eNBi, the mapping relationship $\Delta_i$ between AFN and BFN-i also varies with the clock drifts. According to the minimum requirement on eNB's frequency deviation 0.1 ppm regulated in 3GPP TS 25.104, we can obtain the clock drift in the eNBi and aGW after a day time as:

$$3600*24*0.1*10-6=8.64 \text{ ms}$$

Therefore, the drift of about one frame at most exists in eNBi and the aGW everyday, so the maximum clock drift between the aGW and eNBi is 2*8.64 ms per day.

To guarantee the precision on the mapping relationship $\Delta_i$ between AFN and BFN-i, the synchronization process should be implemented twice a day between the aGW and the eNBi.

After the mapping relationship $\Delta_i$ and the transmission delay $TD_i$ between AFN and BFN-i are obtained, then in step S30 the aGW's controller 120 transmits the node synchronization signal to eNBi in virtue of the aGW's communication unit 130, i.e., to send the calculated mapping relationship $\Delta_i$ to corresponding eNBi.

After eNBi receives the node synchronization signal, the controller 230 of every eNBi sends the node synchronization ACK signal to the aGW in virtue of the eNB's communication unit 210 to confirm that corresponding eNBi has received the mapping relationship $\Delta_i$.

In step S40, if there is an MBMS data packet necessary to be transmitted from the aGW to eNBi, the aGW specifies the MBMS data packet's unified expected transmitting time $AFN_{expect}$ (which is in the format of AFN) for eNBi.

When specifying the unified expected transmitting time, it is necessary for the aGW to take such factors into account as the maximum transmission delay MaxTD between eNBi and the aGW, all eNBs' maximum processing time $T_{proc}$, and an extra guard interval $T_{margin}$. The sum of the maximum transmission delay MaxTD, the maximum processing time $T_{proc}$ and the guard interval $T_{margin}$ is called the waiting time WT.

On the basis of the process of obtaining the node synchronization time information between the aGW and the eNBi in step S10, we can obtain the transmission delays $TD_i$ between the aGW and all relevant eNBs. And of these transmission delays, we can pick out the maximum one, i.e., the MaxTD.

In addition, since extra processing overhead (such as segmentation, coding, modulation, and so on implemented in the data processing unit 240) exists after each eNBi receives an MBMS data packet, it is necessary to preset a maximum processing time $T_{proc}$, and to embed this factor into the waiting time when specifying the unified expected transmitting time. In general, the maximum processing time $T_{proc}$ is preset in advance, i.e., to obtain it in advance statistically or according to the eNB's processing ability.

In addition, it is necessary to take the fact into account that an MBMS data packet would be segmented into data frames for transmitting after it is transmitted to the eNB. To guarantee consistent segmentation to the MBMS data packet in each eNBi, it is necessary to configure the same TFC parameter in relevant eNBs for the MBMS service data so as to ensure consistent segmentation and coding modulation implemented to the MBMS data packet. Therefore, no cascaded operations will be done by the eNB to the MBMS data packet. Data frames in the same MBMS data packet are continuously transmitted by each eNB.

During the transmitting of data frames, since the data frames of a data packet should be transmitted right after the transmission of the ones of the previous data packet, it is necessary to consider the factor how many data frames the MBMS data packet can be segmented when we configure the guard interval.

To implement consistent segmentation to MBMS data packets, a simple process is to pre-define and pre-configure the resource block parameters like IP parameter in both the aGW and the eNBs for each MBMS service data. MBMS data frame's transmission length is known to the aGW, and such segmentation is fixed to the MBMS service.

For each MBMS data packet, the unified expected transmitting time is specified by the aGW's calculation unit 140 as:

$$AFN_{expect} = (AFN_{start}+WT) \bmod 4096 = (AFN_{start}+ \text{Max}TD+T_{proc}+T_{margin}) \bmod 4096 \quad (6)$$

Figure 9:
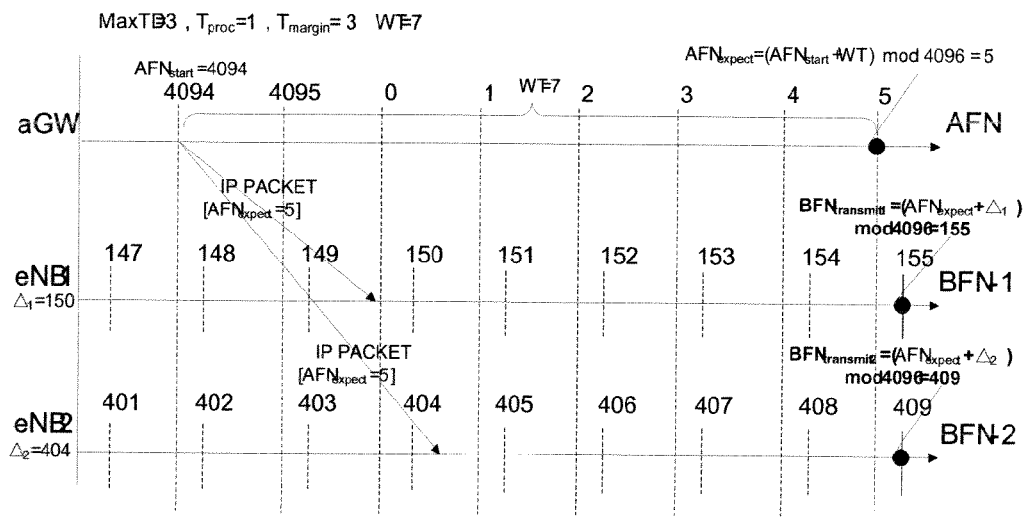
FIG. 9 illustrates how to specify the unified transmitting time and then the relevant transmission embodiment.

FIG. 9 illustrates how to specify the unified expected transmitting time and then gives a corresponding implementation example of the transmission of the unified expected transmitting time. As shown in FIG. 9, $AFN_{start}$=4094, MaxTD=3, $T_{proc}$=1, $T_{margin}$=3, i.e., WT=7, then $AFN_{expect}$=(4094+7) mod 4096=5.

Figure 10:
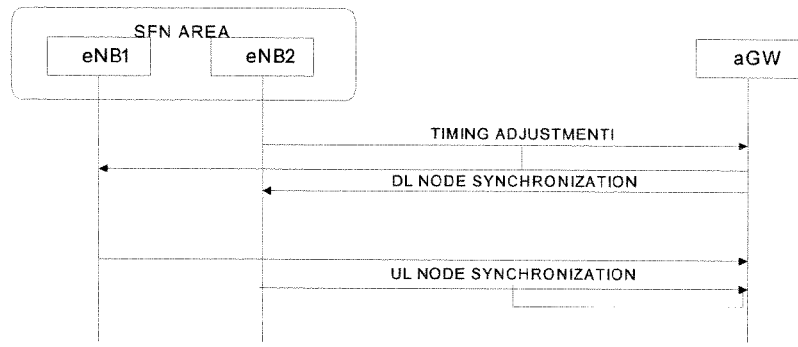
FIG. 10 illustrates how to re-synchronize.

Now in step S50, the aGW indicates the expected transmitting time $AFN_{expect}$ in the MBMS data frame to be transmitted. In each MBMS data packet, the unified expected transmitting time $AFN_{expect}$ is transmitted to each eNBi as in-band information. As shown in FIG. 10, the unified expected transmitting time $AFN_{expect}$=5 is included in the data packets transmitted from the aGW to each eNBi.

In step S60, after the eNBi receives the MBMS data packets, it translate the unified expected transmitting time $AFN_{expect}$ included in the MBMS data packets into the one with its own BFN-i format according to the mapping relationship $\Delta_i$ between the aGW's AFN and its own BFN-i, i.e., $$BFN_{transmiti}=(AFN_{expect}+\Delta_i) \mod 4096 \quad (7)$$

As shown in FIG. 9, for eNB1, the mapping relationship $\Delta_i=150$. Therefore, eNB1's transmitting time $BFN_{transmit1}=(5+150)\mod 4096=155$. And for eNB2, the mapping relationship $\Delta_i=404$. Therefore, eNB2's transmitting time $BFN_{transmit2}=(5+404)=409$.

After every eNB receives the MBMS data packets and calculates the corresponding $BFN_{transmiti}$, it compares the calculated frame number with the eNB's current frame number. If the calculated $BFN_{transmiti}$ is prior to the current frame number, i.e., the calculated $BFN_{transmiti}$ is not suitable for this transmission and then the eNB sends a timing adjustment signal to the aGW, requesting to implement the synchronization process once more.

FIG. 10 illustrates the re-synchronizing process. As shown in FIG. 10, if eNB2 finds out that $BFN_{transmit2}$ is not suitable for the transmission, it sends a timing adjustment signal to the aGW. After the aGW receives the timing adjustment signal, it again sends the downlink node synchronization signal to the eNBs in the SFN area to implement the synchronization process once more. The subsequent steps are just the same as those mentioned above, details are omitted here.

The description above is on the synchronization operations of the eNBs in one SFN area for RF combining. In the case that a SFN area is divided into several sub-SFN areas, then in each sub-SFN area, although the physical layer frame timing synchronization has been achieved to every eNB, no exact alignment is reached to the frame timing boundaries in different sub-SFN areas. And less than one frame (10 ms) at most exists on the frame timing boundaries in different sub-SFN areas. This very satisfies the requirement of soft combining, for the maximum transmission delay allowed for soft combining is 40 ms.

Figure 11:
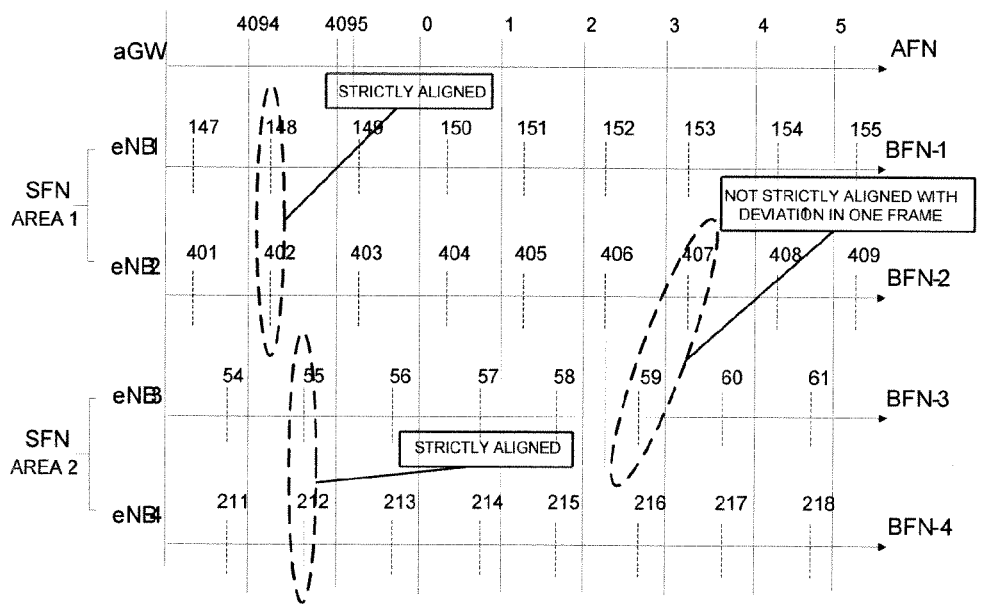
FIG. 11 illustrates the relationship between two SFNs' physical layer frame timing.

FIG. 11 illustrates the relationship between two sub-SFN areas' physical layer frame timing. As shown in FIG. 11, among the four eNBs (eNB1-4) of the aGW, eNB1-2 belong to SFN area 1, and eNB3-4 belong to SFN area 2. Within these two areas, the respective eNBs' physical layer frame timing is aligned just the same. And between the two areas, some deviation less than 10 ms exists in the frame timing.

So, with the method proposed in present invention, not only the RF combining requirement in a single SFN area but also the soft combining requirement in different sub-SFN areas can be satisfied.

In addition, with the application of IP transmission technique, "jitter" error causes to both the data transmitted from the aGW to eNBs and the node synchronization measurement between the aGW and the eNBs. The reason is that the performance of IP transmission technique is related to the network load, i.e., the measured transmission delay in the case of heavy network load differs from that in the case of light load.

Figure 12:
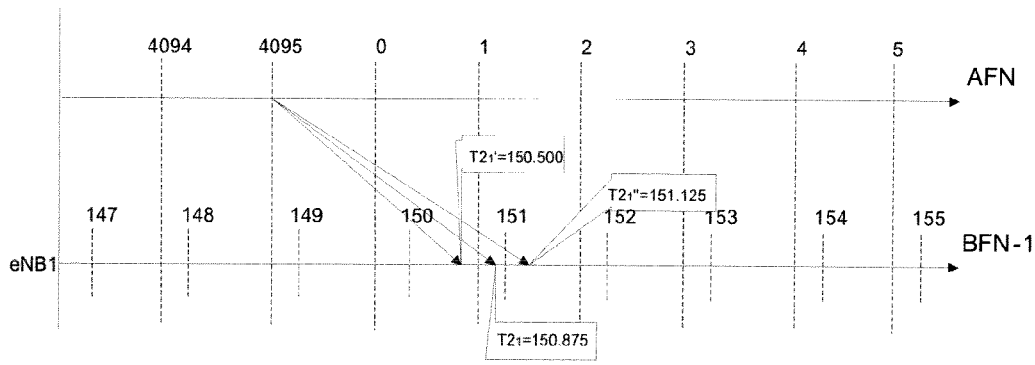
FIG. 12 illustrates the "jitter" error.

FIG. 12 illustrates the "jitter" error. In FIG. 12, AFN denotes the time counter in the format of the aGW's own frame, BFN-1 denotes the time counter in the format of eNB1's own frame, and applied precision of AFN and BEN is ⅛ frames. As shown in FIG. 12, the signal with AFN's frame number 4095 should arrive at the time $T2_1=150.875$ (which is in the format of eNB1's frame number). But since the network load varies, the measured actual arrival time is $T2_1'=150.500$ or $T2_1''=151.125$. When the measured results are in different frames, the jitter will affect the measurement precision so as to further affect the accuracy on specifying the eNB's data packet transmitting time $BEN_{transmit}$.

To solve the "jitter" problem, several synchronization processes like 5~10 times can be implemented between the aGW and the eNBs to gain the resulting transmission delay by averaging the ones obtained all synchronization processes. In this way, 'jitter' error can be scattered into the measurements. And more accurate result will be obtained so that the affection from jitter error will be reduced.

Figure 13:
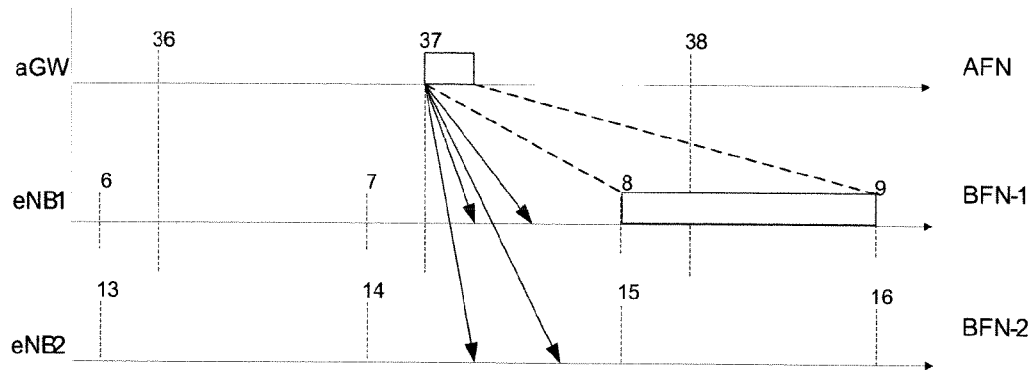
FIG. 13 illustrates the frame length set for eliminating the "jitter" error.

The cause of "jitter" lies in that the frame from aGW possibly spans frames when it arrives at the eNB. If the frame is long enough to exceed the maximum transmission delay between the aGW to the eNB, the jitter error problem can be completely avoided. FIG. 13 illustrates how to configure the frame length to avoid "jitter" error. As shown in FIG. 13, if the maximum transmission delay between the aGW and the eNB is 10 ms, the frame length is configured to be over 10 ms, e.g., 40 ms. In this way, the "jitter" error is always less than one frame. And it no longer causes essential affection to data transmission. The super-frame can be adopted in the configuration of long frames. In this case, the granularity on system synchronization is the super-frame.

The first embodiment above illustrates in detail how to implement the synchronization process in the case of no external reference clock. However, present invention can also be implemented in the case of common external reference clock.

[Second Embodiment]

As described above, common external time can be adopted by both the aGW and eNBs as the reference clock in present invention. For instance, eNBs and the aGW have common external reference clock sources like the GPS system or the Galileo system. And the eNBs and the aGW are synchronous to the external reference clock system.

Figure 14:
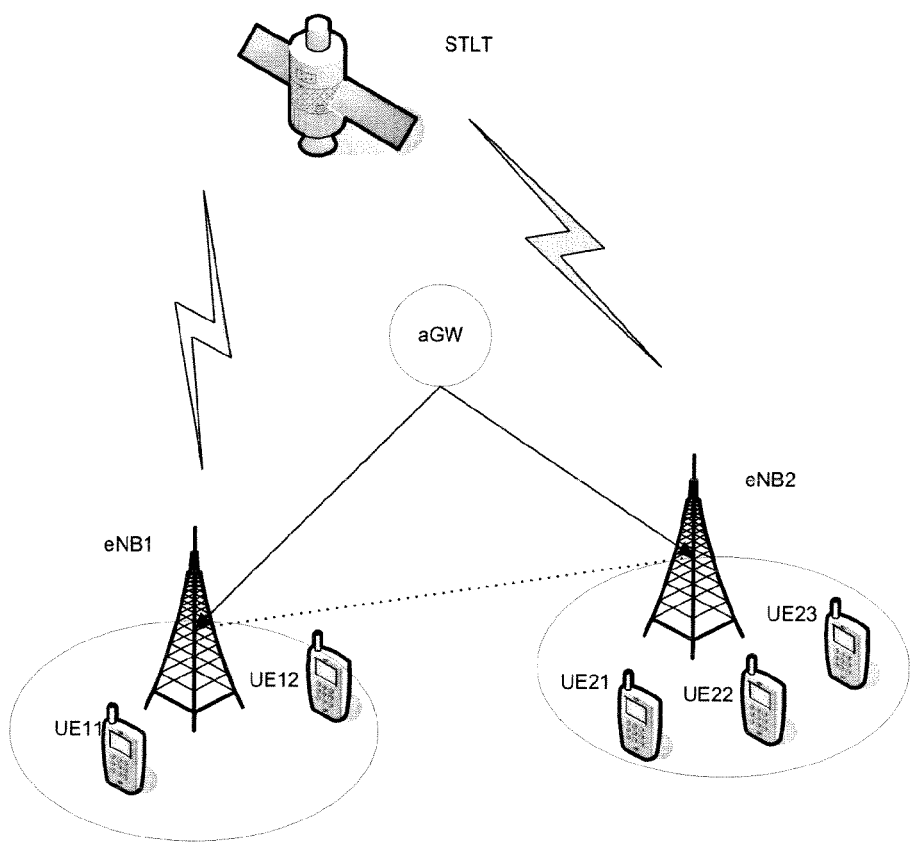
FIG. 14 illustrates a network structure according to the second embodiment of the present invention.

FIG. 14 illustrates the network structure of the second embodiment. As shown in FIG. 14, satellite STLT like GPS satellite or Galileo satellite provides eNB1 and eNB2 (which are connecting with relevant satellite receivers) and the aGW with uniform time baseline.

Figure 15:
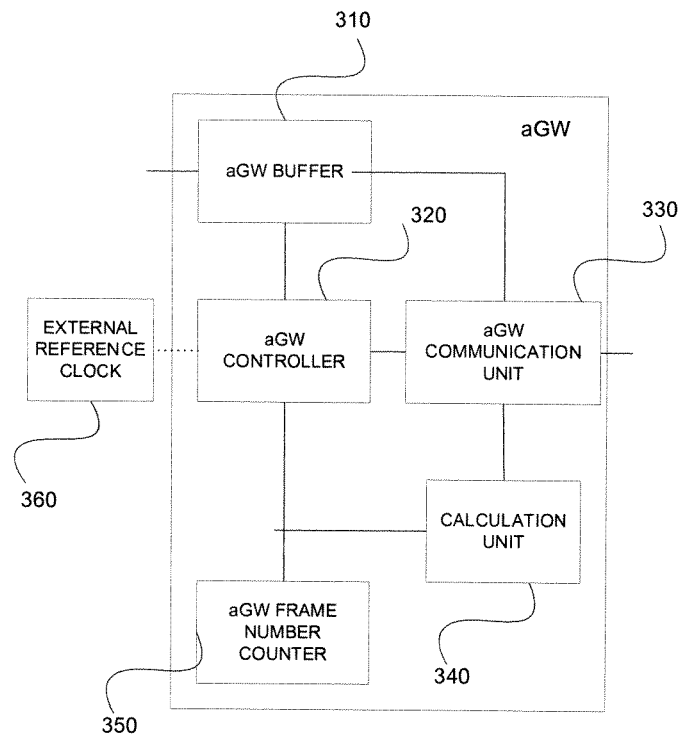
FIG. 15 illustrates a black diagram of the aGW according to the second embodiment of the present invention.
Figure 16:
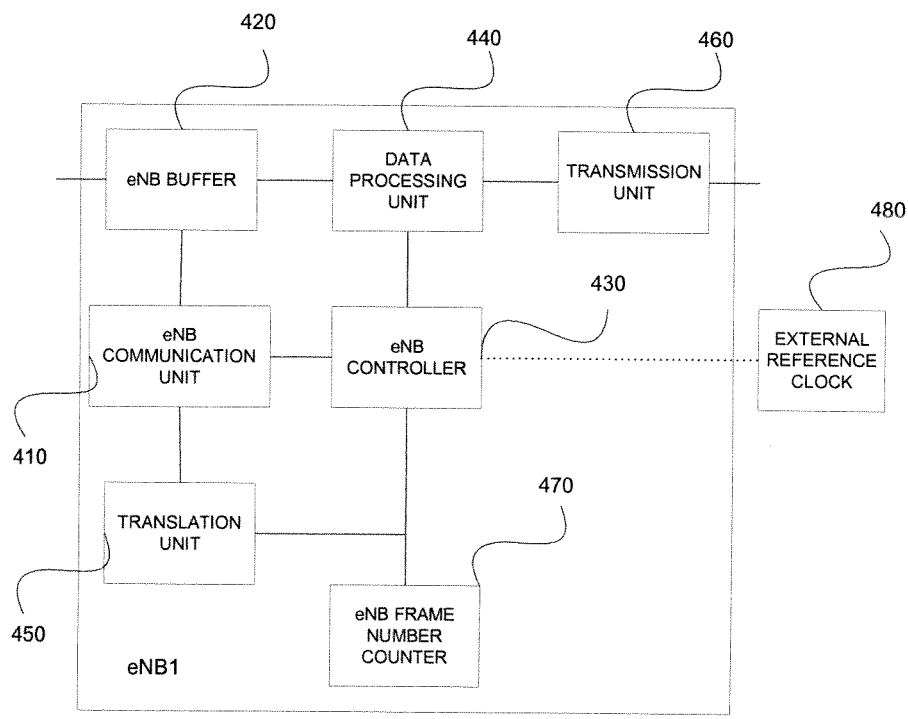
FIG. 16 illustrates a black diagram of the eNB according to the second embodiment of the present invention.

FIG. 15 illustrates a block diagram of the aGW's according to the second embodiment. FIG. 16 illustrates a block diagram o of the eNB according to the second embodiment.

As shown in FIG. 15, the aGW in the second embodiment includes a gateway buffer 310 which buffers the MBMS data packets transmitted from the multimedia broadcast and multicast center, a gateway controller 320 which controls the entire gateway's operations, a gateway communication unit 330 which transmits data packets and signals to UEs and receives signals from UEs, a gateway frame number counter 350 which acts as the system timer of the aGW, a calculation unit 340 which calculate the transmission delays and transmitting time according to the signals received by communication unit from UEs, and an external reference clock 360, e.g., the GPS receiver or the Galileo system receiver.

As shown in FIG. 16, the eNB1 according to the second embodiment includes a communication unit 410 which is responsible for communicating with aGW, a eNB buffer 420 which buffers MBMS data packets transmitted from the aGW, an eNB controller 430 which controls the entire eNB1, a translation unit 450 which translates the MBMS data packet's transmitting time into the real one in BFN format according to the mapping relationship transmitted from the aGW, an eNB frame number counter 470, a data processing unit 440 which implements such operations as segmentation, frame construction and modulation to the received MBMS data packets, a transmission unit 460 which transmits the processed data packets in the data processing unit 440 to UEs according to the transmitting time obtained through the translation unit 450, and an external reference clock 480, e.g., the GPS receiver or the Galileo system receiver. The eNB2 bears the same structure as eNB1. No detailed description will be given here.

Figure 17:
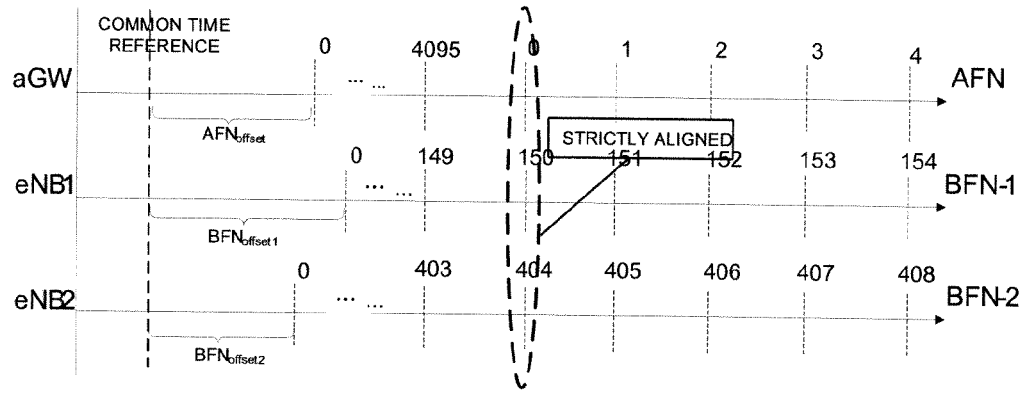
FIG. 17 illustrates the relationship between AFN and BFN-i in the case of external common reference clock.

FIG. 17 illustrates the relationship between AFN and BFN-i in the case of external common reference clock. As shown in FIG. 17, the aGW and eNBs respectively have their own frame number counter, viz., the aGW's AFN and the eNBs' BFN-1 and BFN-2. Although these frame number counters operate independently, they share the same common GPS or Galileo system clock reference. And they are exactly aligned the same on their frame timing boundaries in the SFN area. The frame number offsets $AFN_{offset}$ and $BFN_{offseti}$ relative to common GPS or Galileo system clock reference are known to the aGW and the eNBs.

In this case, the mapping relationship between AFN and BFN is fixed and can be exactly derived according to $AFN_{offset}$ and $BFN_{offseti}$. Now let's get down to the synchronization process in the second embodiment with reference to the steps in FIG. 6 and the illustration in FIG. 18.

Figure 18:
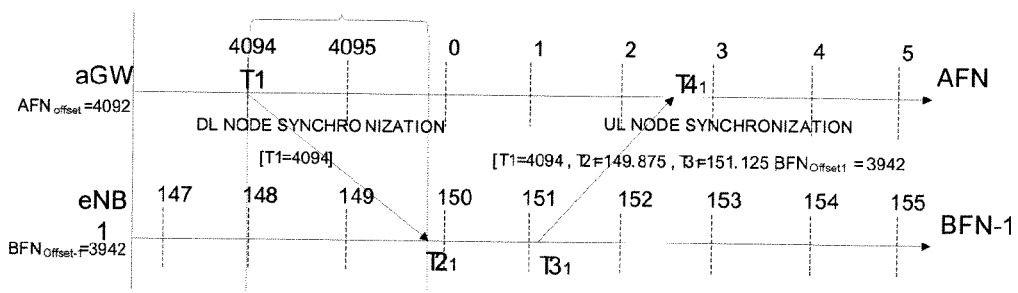
FIG. 18 illustrates the synchronization between the aGW and eNB in the case of common reference clock.

FIG. 18 illustrates the synchronization between the aGW and the eNB in the case of common reference clock.

As shown in FIG. 18, in the first place, the gateway controller 320 sends the downlink node synchronization signal (e.g., the downlink node synchronization control frame) to the eNBs in SFN area through the gateway communication unit 330, requesting to synchronize with the eNBs. It records the current frame number in the aGW's frame number counter 150 as the transmitting time T1, which is included in the downlink node synchronization signal. Then, each eNB receives the downlink node synchronization signal in virtue of the eNB's communication unit 410 and records the current frame number in the eNB's frame number counter 470 as the time T2; for the receiving of downlink node synchronization signal. Now, each eNB responds an uplink node synchronization signal like the uplink node synchronization control frame to the aGW, including at least the time $T2_i$ and $BFN_{offseti}$ (which are in the format of eNB's frame number) when corresponding eNB receives the downlink synchronization signal, and the time $T3_i$ when corresponding eNB transmits the uplink node synchronization signal, or including the transmitting time T1, as shown in FIG. 18.

In this case, no assumption is made that the uplink transmission delay be the same as the downlink transmission delay. The mapping relationship $\Delta_i$ between AFN and BFN can be directly calculated as:

$$\Delta_i = \text{Round}((AFN_{offset} - BFN_{offseti}) \bmod 4096) \quad (8)$$

and the transmission delay $TD_i$ between the aGW and the eNB can be calculated as:

$$TD_i = \text{Ceil}[(((T2_i + BFN_{offseti}) \bmod 4096) - ((T1 + AFN_{offset}) \bmod 4096)) \bmod 4096] \quad (9)$$

where Round denotes the rounding function and Ceil denotes the function of upper rounding into integer. And according to the received time moments and formulae (8) and (9), the calculation unit 140 calculates the mapping relationship $\Delta_i$ and the transmission delay $TD_i$.

Now, with the help of concrete data illustrated in FIG. 18, let's take the relationship and transmission delay exist in the aGW and eNB1 as an example to further describe how to obtain the synchronization time information.

The AFN frame number offset $AFN_{offset}$ that the aGW is relative to the common reference GPS or Galileo system clock is 4092. And the BFN frame number offset $BFN_{offset1}$ that eNB1 is relative to the common reference GPS or Galileo system clock is 3942.

The aGW transmits the downlink node synchronization signal to the eNB1 at the current frame number in the aGW's frame number counter 350, viz., at the time T1=4094, recording current time T1 and including it in the downlink node synchronization signal. In fact, in the second embodiment, on condition that the aGW transmits a downlink node synchronization signal to the eNB, it indicates that the synchronization request has been transmitted out. And it is not necessary to include the time moment T1 when the synchronization request is transmitted out in the synchronization request.

Then, the eNB1 receives the downlink node synchronization signal at the current frame number in the eNB's frame number counter 470, viz., at the time $T2_1 = 149.875$. Now, the eNB transmits the uplink node synchronization signal at BFN's current frame number, viz., at the time $T3_1 = 151.125$, including at least the time $T2_1$ when eNB1 receives the downlink node synchronization signal and the BFN frame number offset $BFN_{offset1}$ eNB1 relative to the common reference GPS or Galileo system clock. Of course, the uplink node synchronization signal can also include the aGW's transmitting time T1 and the time $T3_1$ when eNB1 transmits the uplink node synchronization signal.

Next, the aGW receives the uplink node synchronization signal at the current frame number in the aGW's frame number counter 350, viz., at the time $T4_1$ to obtain at least $T2_1$ and $BFN_{offset1}$.

Then, according to T1 recorded or included in the uplink node synchronization signal, and the obtained information on $T2_1$ and $AFN_{offset}$ and $BFN_{offset1}$, the calculation unit 340 can calculate the mapping relationship between AFN and eNB1's BFN as:

$$\Delta_1 = \text{Round}((AFN_{offset} - BFN_{offset1}) \bmod 4096) = 150$$

Thus:

$$BFN\text{-}1 = (AFN + 150) \bmod 4096$$

and the transmission delay between the aGW and the eNB1 in this path is:

$$TD_1 = \text{Ceil}[(((T2_1 + BFN_{offset1}) \bmod 4096) - ((T1 + AFN_{offset}) \bmod 4096)) \bmod 4096] = 2$$

In this way, we obtain the mapping relationship $\Delta_i$ and the transmission delay $TD_i$ between the aGW and the eNBs.

Steps after having obtained the mapping relationship $\Delta_i$ and transmission delay $TD_i$ are just the same as that in the first embodiment. No detail will be given here.

Thus, the synchronization processing mechanism is discussed respectively in present invention, the China patent application 200610029863.7 (Title: Method and Device for Synchronization Between Network Devices in Radio communication system; Filing Date: Aug. $9^{th}$ 2006), and the China patent application 200610028109.1 (Title: Method and Device for Resource Scheduling for Broadcast and Multicast in Radio Access Network; Filing Date: Jun. $23^{rd}$ 2006), for RF combining in 3GPP long-term evolve EMBMS in three aspects. With the synchronization processing mechanism, the problems are settled for UE in RF combining for LTE MBMS data packets.

Figure 19:
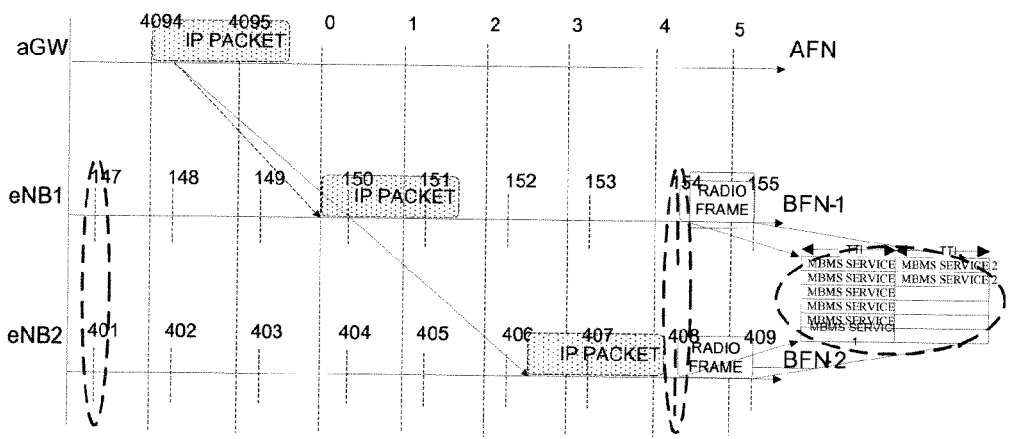
FIG. 19 illustrates the required three-layer synchronization structure for RF combining in LTE.

FIG. 19 illustrates three-layer synchronization structure required for RF combining in LTE.

As shown in FIG. 19, detailed hierarchical synchronization structure supporting MBMS RF combining in a SFN area is as follows:

Physical Layer Frame Timing Synchronization

This synchronization requires that the physical layer frame timing of all eNB in the SFN area be aligned the same on the frame boundaries so as to guarantee the synchronization of physical layer frame timing, as shown by the ellipse on the left of FIG. 19. This requirement is made to layer 1 physical frame timing synchronization with the precision being the level of microsecond (please refer to the China patent application 200610029863.7).

L2 Content Transmission Synchronization

This synchronization requires that MBMS service data with consistent content be transmitted at the same time in the form of radio frames by each eNB in the SFN area. That is to say, as described in the first and second embodiments, synchronization is first implemented between the aGW and the eNB to specify the transmitting time moment for the MBMS data packets. Then, the MBMS data packets are transmitted in the form of IP packets from the aGW to the eNBs. And they are transmitted to UEs in the form of radio frames at the specified transmitting time moment $BFN_{transmit}$ (see the ellipse in the middle of FIG. 19). In this way, in time RF combining of data with consistent content can be guaranteed in the UEs.

L3 Service Scheduling Synchronization

The in-the-air interface's RF combining is considered for the physical resource block. It requires that the same MBMS service data be transmitted through consistent time frequency resource by different eNBs in the SFN area, as shown by the ellipse on the most right in FIG. 19. That is to say, in different eNBs, the physical resource block patterns for the transmission of MBMS service in each scheduling cycle period must be consistent. As shown in FIG. 19, MBMS services 1-4 are respectively transmitted in virtue of corresponding time frequency resource (refer to the China patent application 200610028109.1).

The description above is only suitable for the embodiments of present invention. Technician in this field should understand that any modification or local replacement within the scope of present invention is confined within the claims of present invention. So, the protection scope confined by the claims is the one of present invention.

What is claimed is:

1. A method for implementing synchronization between a gateway and base stations, comprising:
    sending a synchronization request signal from the gateway to the base stations at a first sending time, wherein the synchronization request signal is received by each base station at a corresponding first receiving time;
    receiving a synchronization response signal at the gateway from each base station at a corresponding second receiving time, wherein each synchronization response signal is sent by the corresponding base station at a corresponding second sending time, wherein each synchronization response signal comprises parameter values indicative of the first receiving time and the second sending time for the corresponding base station; and
    calculating a mapping relationship between a time system of the gateway and a time system of each base station based on the first sending time, the first receiving time for the corresponding base station, the second sending time for the corresponding base station, and the second receiving time associated with the corresponding base station.

2. The method as claimed in claim 1, further comprising: sending from the gateway to the base stations information comprising the mapping relationship.

3. The method as claimed in claim 2, further comprising: receiving an ACK signal from each base station at the gateway after the corresponding base station receives the mapping relationship information.

4. The method as claimed in claim 2, further comprising: calculating for each base station a transmission delay between the gateway and the corresponding base station based on the first sending time, the first receiving time for the corresponding base station, the second sending time for the corresponding base station, and second receiving time associated with the corresponding base station;
    determining a maximum transmission delay among the calculated transmission delays;
    specifying an expected transmitting time for data packets to be transmitted according to a waiting time larger than the maximum transmission delay; and
    sending from the gateway to the base stations the expected transmitting time.

5. The method as claimed in claim 4, wherein the sending of the expected transmitting time comprises:
    including the expected transmitting time into the data packets; and
    sending the data packets including the expected transmitting time to the base stations.

6. The method as claimed in claim 5
    wherein each base station receives the corresponding data packets
    and translates the expected transmitting time included in the data packets into a real transmitting time in the format of a time system of the corresponding base station according to the mapping relationship.

7. The method as claimed in claim 6
    wherein each base station compares the corresponding real transmitting time with a current time for the time system of the corresponding base station to determine whether the real transmitting time is valid or not and
    sends a re-synchronization request signal to the gateway requesting the gateway to implement synchronization again if the real transmitting time is not valid.

8. The method as claimed in claim 4, wherein the calculating of the transmission delays and the determining of the maximum transmission delay are implemented a plurality of times, and an average of the determined maximum transmission delays is used as the determined maximum transmission delay between the base stations and the gateway.

9. The method as claimed in claim 1, wherein the synchronization request signal and synchronization response signals are transmitted in control frames.

10. The method as claimed in claim 9, wherein each control frame is longer than 10 ms.

11. The method as claimed in claim 1, wherein the synchronization request signal comprises a parameter value indicative of the first sending time so as to send the first sending time to the base stations.

12. A method for implementing synchronization between a gateway and base stations, comprising:
    sending a synchronization request signal from the gateway to the base stations at a first sending time,
    wherein the synchronization request signal is received by each base station at a corresponding first receiving time;
    receiving a synchronization response signal at the gateway from each base station, wherein each synchronization response signal is sent by the corresponding base station a corresponding second sending time, wherein each synchronization response signal comprises parameter values indicative of the second sending time and a first offset between a time system of the corresponding base station and a baseline time; and
    calculating a mapping relationship between a time system of the gateway and the time system of each base station according to the corresponding first offset and a second offset between the gateway's time system and the baseline time.

13. The method as claimed in claim 12, further comprising:
sending from the gateway to the base stations information comprising the mapping relationship.

14. The method as claimed in claim 13, further comprising:
receiving an ACK signal from each base station at the gateway after the corresponding base station receives the mapping relationship information.

15. The method as claimed in claim 13, further comprising:
calculating for each base station a transmission delay between the gateway and the corresponding base station according to the first sending time, the first receiving time for the corresponding base station, the first offset associated with the corresponding base station and the second offset;

determining a maximum transmission delay among the calculated transmission delays;

specifying an expected transmitting time for data packets to be transmitted according to a waiting time larger than the maximum transmission delay; and sending the expected transmitting time to the base stations.

16. The method as claimed in claim 15, wherein the sending of the expected transmitting time comprises:
including the expected transmitting time into the data packets; and
transmitting the data packets including the expected transmitting time to the base stations.

17. The method as claimed in claim 16
wherein each base station receives the corresponding data packets
and translates the expected transmitting time included in the data packets into a real transmitting time in the format of a time system of the corresponding base station according to the mapping relationship.

18. The method as claimed in claim 17
wherein each base station compares the corresponding real transmitting time with a current time for the time system of the corresponding base station to determine whether the real transmitting time is valid or not and
sends a re-synchronization request signal to the gateway to request the gateway to implement synchronization again if the real transmitting time is not valid.

19. The method as claimed in claim 12, wherein the step calculating of the transmission delays and the determining of the maximum transmission delay are implemented a plurality of times, and an average of the determined maximum transmission delays is used as the determined maximum transmission delay between the base stations and the gateway.

20. The method as claimed in claim 12, wherein the synchronization request signal and synchronization response signals are transmitted in control frames.

21. The method as claimed in claim 20, wherein each control frame is longer than 10 ms.

22. The method as claimed in claim 12, wherein the synchronization request signal comprises the first sending time so as to send the first sending time to the base stations; and the synchronization response signal comprises the second sending time.

23. A gateway comprising:
a communication module configured to transmit a synchronization request signal to at least one base station at a first transmitting time, and to receive, from one or more base station to which the synchronization request signal was transmitted, a synchronization response signal including parameter values for a first receiving time when the corresponding base station received the synchronization request signal and a second transmitting time when the corresponding base station transmitted the synchronization response signal, wherein the communication module configured to identify the time at which the synchronization response signal is received from the corresponding base station as a second receiving time; and a calculation processor configured to calculate, for each base station from which the synchronization response signal was received, a mapping relationship between a time system of the gateway and a time system of the corresponding base station according to the first transmitting time, the first receiving time for the corresponding base station, the second transmitting time for the corresponding base station and the second receiving time associated with the corresponding base station.

24. The gateway as claimed in claim 23, wherein the communication module is further configured to send to the corresponding base station information including the mapping relationship calculated by the calculation processor.

25. The gateway as claimed in claim 24, wherein the calculation processor is further configured to calculate transmission delays for the corresponding base stations according to the first transmitting time, the first receiving time for the corresponding base station, the second transmitting tune for the corresponding base station, and the second receiving time associated with the corresponding base station, determine a maximum transmission delay among the calculated transmission delays, and specify an expected transmitting time for data packets to be transmitted according to a waiting time larger than the maximum transmission delay.

26. The gateway as claimed in claim 25, wherein the communication module is further configured to include the expected transmitting time into the data packets to be transmitted, and transmit the data packets to the corresponding base stations.

27. A gateway as claimed in claim 23 incorporated in a communication network comprising at least one base station.

28. A base station comprising:
a communication module configured to receive a synchronization request signal transmitted by a gateway at a first transmitting time, send a synchronization response signal to the gateway, the synchronization response signal including parameter values for a first receiving time indicative of when the synchronization request signal was received and a second transmitting time indicative of when the synchronization response signal was sent to the gateway, the communication module also configured to receive information relating to a mapping relationship between a time system of the base station and a time system of the gateway from the gateway, wherein the mapping relationship information is based on the first transmitting time, the first receiving time, the second transmitting time, and a second receiving time at which the synchronization response signal was received by the gateway, and the communication module also configured to receive from the gateway data packets including an expected transmitting time; and a translation processor configured to translate the expected transmitting time into a real transmitting time in the format of the base station's time system.

29. The base station as claimed in claim 28, further comprising
a controller processor configured to compare the real transmitting time with a current time for the base station's time system to determine whether the real transmitting time is valid or not, and control the communication module to send a re-synchronization request signal to request the gateway to implement synchronization again if the real transmitting time is not valid.

30. The base station as claimed in claim 28 wherein a transmission delay between the gateway and the base station is calculated by the gateway based on the first transmitting time first receiving time, second transmitting time, and second transmitting time in order for the gateway to determine a maximum transmission delay among calculated transmission delays between the gateway and one or more base stations so the gateway can specify the expected transmitting time for data packets to be transmitted according to a waiting time larger than the maximum transmission delay.

31. A gateway comprising:
a communication module configured to transmit a synchronization request signal to at least one base station at a first transmitting time, and to receive, from one or more base station to which the synchronization request signal was transmitted, a synchronization response signal including parameter values for a first receiving time when the corresponding base station received the synchronization request signal and a first offset between a time system of the corresponding base station and a baseline time; and
a calculation processor configured to calculate, for each base station from which the synchronization response signal was received, a mapping relationship between a time system of the gateway and the time system of the corresponding base station according to the first offset and a second offset between the gateway's time system and the baseline time.

32. The gateway as claimed in claim 31, wherein the communication module is further configured to send to the corresponding base station information including the mapping relationship calculated by the calculation processor.

33. The gateway as claimed in claim 32, wherein the calculation processor is further configured to calculate transmission delays for the corresponding base stations according to the first transmitting time, the first receiving time for the corresponding base station, the first offset associated with the corresponding base station, and the second offset, determine a maximum transmission delay among the calculated transmission delays, and specify an expected transmitting time for data packets to be transmitted according to a waiting time larger than the maximum transmission delay.

34. The gateway as claimed in claim 33, wherein the communication module is configured to include the expected transmitting time into the data packets to be transmitted, and transmit the data packets to the corresponding base stations.

35. A gateway as claimed in claim 31 incorporated in a communication network comprising at least one base station.

36. A base station comprising:
a communication module configured to receive a synchronization request signal transmitted by a gateway at a first transmitting time, send a synchronization response signal to the gateway, the synchronization response signal including parameter values for a first receiving time indicative of when the synchronization request signal was received and a first offset between a time system of the base station and a baseline time, the communication module also configured to receive from the gateway information relating to a mapping relationship between the base station's time system and a time system of the gateway from the gateway, wherein the mapping relationship is based on the first transmitting time, the first receiving time, the first offset, and a second offset between the gateway's time system and the baseline time, and the communication module also configured to receive data packets including an expected transmitting time; and
a translation processor configured to translate the expected transmitting time into a real transmitting time in the format of the base station's time system.

37. The base station as claimed in claim 36, further comprising
a controller processor configured to compare the real transmitting time with a current time for the base station's time system to determine whether the real transmitting time is valid or not, and control the communication module to send a re-synchronization request signal to request the gateway to implement synchronization again if the real transmitting time is not valid.

38. The base station as claimed in claim 36 wherein a transmission delay between the gateway and the base station is calculated by the gateway based on the first transmitting time, the second transmitting time, the first offset, and the second offset in order for the gateway to determine a maximum transmission delay among calculated transmission delays between the gateway and one or more base stations so the gateway can specify the expected transmitting time for data packets to be transmitted according to a waiting time larger than the maximum transmission delay.

* * * * *